United States Patent
Kanno

(10) Patent No.: US 8,611,937 B2
(45) Date of Patent: Dec. 17, 2013

(54) FM RECEIVING DEVICE AND FILTERING METHOD

(75) Inventor: Hideyuki Kanno, Saitama (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/582,621

(22) PCT Filed: Mar. 5, 2010

(86) PCT No.: PCT/JP2010/053655
§ 371 (c)(1),
(2), (4) Date: Sep. 4, 2012

(87) PCT Pub. No.: WO2011/108111
PCT Pub. Date: Sep. 9, 2011

(65) Prior Publication Data
US 2012/0329414 A1   Dec. 27, 2012

(51) Int. Cl.
*H04B 15/00* (2006.01)
*H04B 1/00* (2006.01)

(52) U.S. Cl.
USPC .... 455/506; 455/63.1; 455/67.13; 455/226.1; 455/307; 375/349; 375/350

(58) Field of Classification Search
USPC ............ 455/63.1, 67.11, 67.13, 214, 226.1, 455/226.2, 226.3, 296, 307, 501, 506; 375/346, 349, 350
See application file for complete search history.

(56) References Cited

U.S. PATENT DOCUMENTS

| | | | | |
|---|---|---|---|---|
| 5,117,401 | A | * | 5/1992 | Feintuch ............ 367/135 |
| 5,526,378 | A | | 6/1996 | Knutson et al. |
| 5,557,646 | A | * | 9/1996 | Honma ............ 375/346 |
| 7,116,703 | B2 | * | 10/2006 | Bouillet et al. ........ 375/346 |

FOREIGN PATENT DOCUMENTS

JP       8-237179     9/1996
WO    WO 2006/103922    10/2006

OTHER PUBLICATIONS

International Search Report, PCT/JP2010/053655, Jun. 1, 2010.

* cited by examiner

*Primary Examiner* — Quochien B Vuong
(74) *Attorney, Agent, or Firm* — Young & Thompson

(57) ABSTRACT

A level detection part 221 detects the field intensity of airwaves broadcast by a desired station, and an AM component extraction part 222 and a level detection part 223 cooperate with one another in detecting the multipath noise level. When the field intensity of the airwaves broadcast by the desired station is high and also the multipath noise level is comparatively low, a filter setting part 229 determines filtering processing to be performed by an adaptive filter part 133 as being FIR type filtering processing. And the filter setting part 229 performs settings for FIR type filtering processing on the adaptive filter part 133. As a result, it is possible to enhance the reproduction quality of the broadcast content sent by the desired station that has been tuned.

11 Claims, 8 Drawing Sheets

FM RECEIVING DEVICE AND FILTERING METHOD

TECHNICAL FIELD

The present invention relates to an FM reception device, to a filtering processing method and a filtering processing program, and to a recording medium upon which said filtering processing program is recorded.

BACKGROUND ART

From the past, FM reception devices that receive and process FM (Frequency Modulation) broadcast airwaves and reproduce their broadcast contents have been widespread. Radio waves on the VHF band that are employed as FM broadcast airwaves of this type are reflected by buildings and so on. As a result the multipath phenomenon occurs in which, one or more waves reflected by buildings and so on are received by the FM reception device in addition to the direct FM broadcast wave.

When such a multipath phenomenon occurs, the quality of reproduction of the broadcast contents is deteriorated due to multipath fading because of interference between the direct wave and the reflected wave or waves. In particular, if the FM reception device is mounted to a mobile object such as a vehicle or the like, then it is often used in an environment easily influenced by the multipath phenomenon to be experienced.

Due to this, techniques of various types have been proposed for reducing the influence of multipath fading. One such technique that has been proposed has been the technique of, along with employing a digital adaptive filter for the FM reception device that has the beneficial effect of suppressing the influence of multipath fading, also using either an IIR (Infinite Impulse Response) type adaptive filter or an FIR (Finite Impulse Response) type adaptive filter, depending on the field intensity of the received wave of the FM broadcast airwave (hereinafter referred to as the "received FM wave") (refer to Patent Document #1, hereinafter referred to as the "prior art example").

In the technique of this prior art example, if it is decided that the field intensity of the received FM wave is greater than a predetermined threshold value, so that the influence experienced due to multipath fading becomes great, then the IIR type adaptive filter is selected. Moreover, if it is decided that the field intensity of the received FM wave is lower than the predetermined threshold value, so that the influence of flat fading becomes great, then the FIR type adaptive filter is selected.

PRIOR ART DOCUMENTS

Patent Literature

Patent Document #1: WO 2006/103922 A1

SUMMARY OF THE INVENTION

Problems to be Solved by the Invention

In the technique of the above described prior art example, if the field intensity of the received FM wave is greater than the predetermined threshold value, then the IIR type adaptive filter is used without further consideration. However, even if the field intensity of the received FM wave is high, the influence of multipath fading with an IIR type adaptive filter has low effect, for example, for a multipath phenomenon with short delay time period caused by buildings, streets and so on. Moreover, the convergence speed of an IIR type adaptive filter is slow as compared with that of an FIR type adaptive filter. Due to this, an IIR type adaptive filter does not always show more excellent effect for blocking the influence of multipath fading than that of FIR type adaptive filter, when the field intensity of the received FM wave is higher than the predetermined threshold value.

Alternatively, in filtering processing by an FM reception device, sometimes it is also necessary to consider adjacent channel interference caused by the FM broadcast airwave of a neighboring station, of which frequency is neighboring a tuned frequency on a frequency axis. When blocking this type of adjacent channel interference, the FIR type filter shows the effect for eliminating the adjacent channel interference or that for reducing distortion of the intermediate frequency signal brought by narrowing the intermediate frequency bandwidth. In contrast, the IIR type adaptive filter does not show such types of effects. From this viewpoint as well, it is not a best way to automatically use the IIR adaptive filter, if the field intensity of the received FM wave is high.

Due to this, a technique is expected that can appropriately block the influences from the multipath phenomenon and the like to improve the reproduction quality of the broadcast contents. To fulfill this requirement is one of the problems to be solved by the present invention.

The present invention has been conceived under the above-described circumstances, and its object is to provide an FM reception device and a filtering processing method for being capable of improving the reproduction quality of broadcast contents sent by a desirable tuned station.

Means for Solving the Problems

When considered from a first standpoint, the present invention is an FM reception device comprising: a first detection part configured to detect a field intensity of an FM wave; a second detection part configured to detect a multipath noise level on a frequency band region of said FM wave; an adaptive filter part configured to selectively perform filtering processing upon an intermediate frequency signal according to said FM wave by using a selected filter, when either one of a finite impulse response type filter or an infinite impulse response type filter is selected responding to a filter selection instruction; and a first control part configured to send a instruction to choose said finite impulse response type filter as said filter selection instruction to said adaptive filter part, when a first condition is satisfied that the field intensity detected by said first detection part is lower than a predetermined field intensity; or when a second condition is satisfied that the field intensity detected by said first detection part is not lower than said predetermined field intensity, and it is decided that the multipath noise level is lower than a first predetermined multipath noise level and the multipath noise level is not lower than a second predetermined multipath noise level, which is lower than the first predetermined multipath noise level.

When considered from a second standpoint, the present invention is a filtering method, used by an FM reception device comprising: a first detection part configured to detect the field intensity of an FM wave, a second detection part configured to detect the multipath noise level on the frequency band region of said FM wave, and an adaptive filter part configured to selectively perform filtering processing upon an intermediate frequency signal according to said FM wave with said selected filter by a filter selection instruction, if either one of a finite impulse response type filter or an infinite impulse response type filter is selected, comprising the steps of deciding whether or not either a first condition or a second condition is satisfied, wherein the first condition is that the field intensity detected by said first detection part is lower than a predetermined field intensity, and the second condition is that the field intensity detected by said first detection part is not lower than said predetermined field intensity, the multipath noise level is lower than a first predetermined multipath noise level, and the multipath noise level is not lower than a second predetermined multipath noise level which is lower than said first predetermined multipath noise level, and controlling so as to send an instruction that said finite impulse response type filter is to be selected, if the decision result of said decision process is affirmative, to said adaptive filter part, as said filter selection instruction.

When considered from a third standpoint, the present invention is a filtering program, wherein it causes the filtering processing method of the present invention to be executed by a calculation part.

And, when considered from a fourth standpoint, the present invention is recorded so as to be capable of read by a calculation part is recorded thereupon.

EMBODIMENTS FOR CARRYING OUT THE INVENTION

Figure 1:
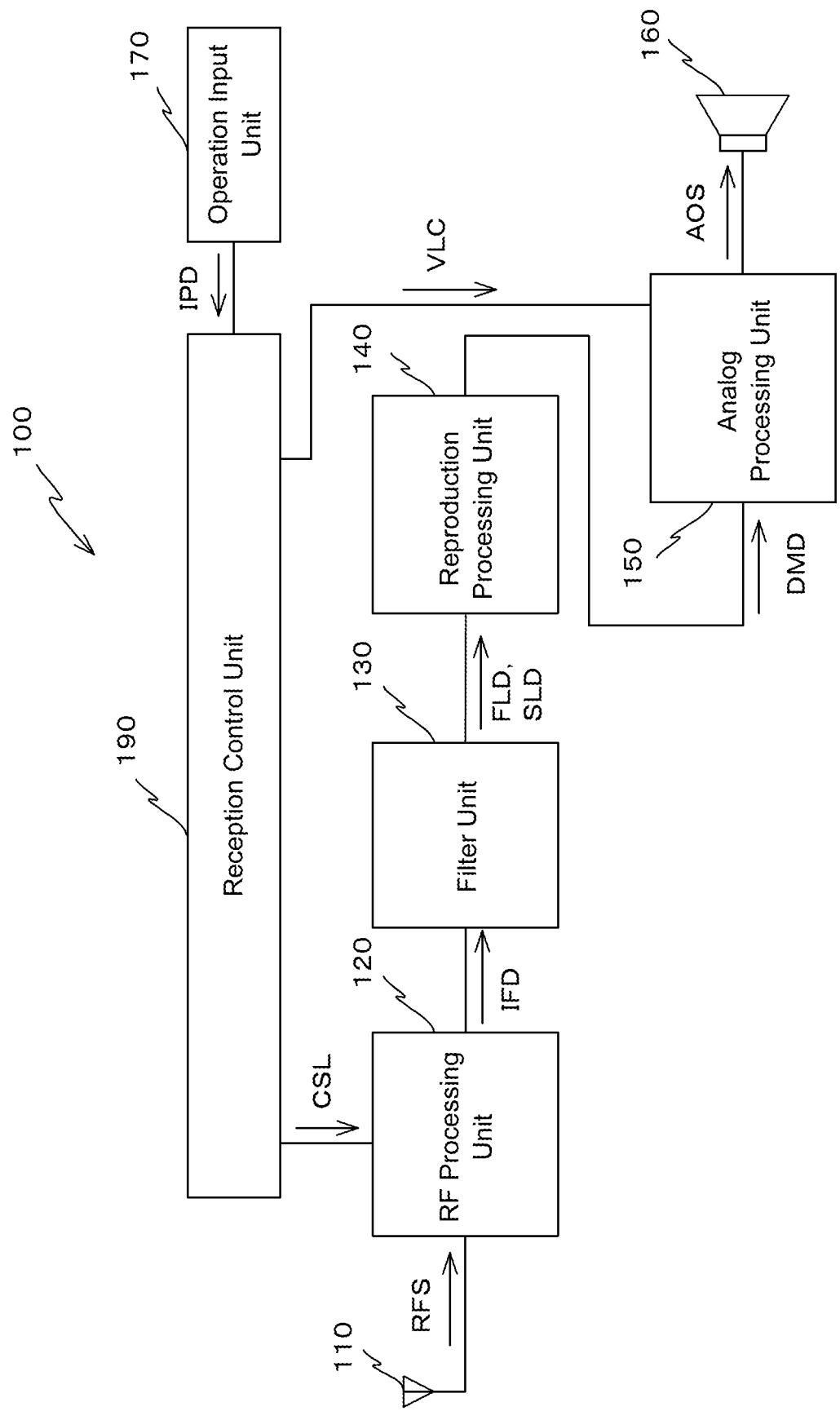
FIG. 1 is a block diagram schematically showing the structure of an FM reception device 100 according to an embodiment of the present invention.

In the following, embodiments of the present invention will be explained with reference to FIGS. 1 through 10. It should be understood that, in the following explanation and in the drawings, the same reference symbols are appended to elements that are the same or equivalent, with duplicated explanation being omitted.

[Structure]

The schematic structure of an FM reception device 100 according to an embodiment is shown in FIG. 1. As shown in the FIG. 1, the FM reception device 100 comprises an antenna 110 and an RF processing unit 120 that serves as a high frequency processing part. Furthermore, the FM reception device 100 comprises a filter unit 130, a reproduction processing unit 140, and an analog processing unit 150. Yet further, the FM reception device 100 comprises a speaker unit 160, an operation input unit 170, and a reception control unit 190.

The antenna 110 receives broadcast airwaves. The result of reception by the antenna 110 is sent to the RF processing unit 120 as a received signal RFS.

According to a tuning instruction CSL sent from the reception control unit 190, the RF processing unit 120 performs tuning processing to extract the signal from a desired station to be tuned from the received signal RFS; then it sends the signal to the filter unit 130 as a signal IFD having a component on a predetermined intermediate frequency band. The RF processing unit 120 comprises an input filter, a high frequency amplifier (RF-AMP: Radio Frequency Amplifier), and a band pass filter (hereinafter, also sometimes termed an "RF filter"). Moreover, the RF processing unit 120 comprises a mixer (a mixing device), an A/D (Analog to Digital) converter, and a local oscillation circuit (OSC).

Here, the input filter is a high pass filter that intercepts the low frequency component of the signal received from the antenna 110. The high frequency amplifier amplifies the signal that has passed through the input filter. In the signal outputted from the high frequency amplifier, the RF filter selectively passes the signals on the high frequency band. The mixer mixes together the signal passed through the RF filter and a local oscillation signal supplied from the local oscillation circuit. The A/D converter converts the result of mixing by the mixer from analogue to digital to generate a signal IFD, and sends the generated signal IFD to the filter unit 130.

Note that the local oscillation circuit is composed of an oscillator and the like, of which oscillation frequency can be controlled by voltage control or the like, and so on. According to the tuning instruction CSL sent from the reception control unit 190, the local oscillation circuit generates a local oscillation signal at a frequency corresponding to the desired station, to which tuning is to be performed, and supplies the local oscillation signal to the mixer.

The filter unit 130 receives the signal IFD from the RF processing part 120. And the filter unit 130 performs filtering processing in order to eliminate distortion of the received signal due to the occurrence of so called multipath propagation, and in order to eliminate adjacent channel interference. It should be understood that the structure of the filter unit 130 will be described hereinafter.

The filter unit 130 sends the result of filtering processing to the reproduction processing unit 140 as a signal FLD. Moreover, the filter unit 130 sends to the reproduction processing unit 140 the result of detection of the electric field strength of the received signal, which is corresponding to the desired station tuned, as a signal level SLD.

The reproduction processing part 146 receives the signal FLD and the signal level SLD from the filter unit 130. After detection processing for the signal FLD, the reproduction processing unit 140 performs demodulation processing upon the detection result to generate a signal DMD, and then it sends the signal DMD to the analog processing unit 150. Here, the demodulation processing includes separation processing of FLD into an L channel signal and an R channel signal, referring to the signal level SLD. It should be understood that the structure of the reproduction processing unit 140 will be described hereinafter.

The analog processing unit 150 receives the signal DMD from the reproduction processing unit 140. Then, under the control by the reception control unit 190, the analog processing unit 150 generates an output audio signal AOS to send it to the speaker unit 160.

The analog processing unit 150 comprises a D/A (Digital to Analog) conversion part, an audio volume adjustment part, and a power amplification part. Here, the D/A conversion part receives the signal DMD sent from the reproduction processing unit 140. Then, the D/A conversion part converts the signal DMD into an analog signal. Note that the D/A conversion part comprises two D/A (Digital to Analog) converters having mutually similar structures and corresponding to the left channel (hereinafter termed the "L channel") and to the right channel (hereinafter termed the "R channel"), both of them are included in the signal DMD. The result of analog conversion by the D/A conversion part is sent to the audio volume adjustment part.

Furthermore, the audio volume adjustment part receives the results of analog conversion of the L and the R channels sent from the D/A conversion part. Then, according to an audio volume adjustment instruction VLC from the reception control unit 190, the audio volume adjustment part performs audio volume adjustment processing upon the signals resulting from analog conversion corresponding to each of the L and the R channels. Note that the audio volume adjustment part includes two sets of electronic volume element and so on, corresponding to the L and R channels both having mutually similar structures. The adjustment result signal from the audio volume adjustment part is sent to the power amplification part.

The power amplification part receives the signal as the audio volume adjustment result of the L and R channel from the audio volume adjustment par. Then, the power amplification part performs power amplification of these signals. Note that the power amplification part includes two power amplifiers, both of which are corresponding to the L and R channels, having mutually similar structures. The output audio signal AOS, the result of amplification by the power amplification part, is sent to the speaker unit 160.

The speaker unit 160 comprises an L channel speaker and an R channel speaker. The speaker unit 160 outputs reproduced sound according to the output audio signal AOS sent from the analog processing unit 150.

The operation input unit 170 comprises a key part provided to the main body part of the FM reception device 100, or a remote input device or the like including a key part. Here, a touch panel provided to a display unit not shown in the figures may be used as the key part provided to the main body part. Moreover, instead of a structure having a key part, a structure for voice entry may be employed. The result of input operation to the operation input unit 170 is sent to the reception control unit 190 as operation input data IPD.

The reception control unit 190 analyzes the operation input data IPD from the operation input unit 170. Then, if the content of the operation input data IPD has specified tuning, the reception control unit 190 generates a tuning instruction CSL corresponding to the desired station that has been specified to send it to the RF processing part 120. If the content of the operation input data IPD is audio volume adjustment specification, including an audio volume adjustment aspect, the reception control unit 190 generates an audio volume adjustment instruction VLC corresponding to the specified audio volume adjustment aspect to send it to the analog processing unit 150.

Figure 2:
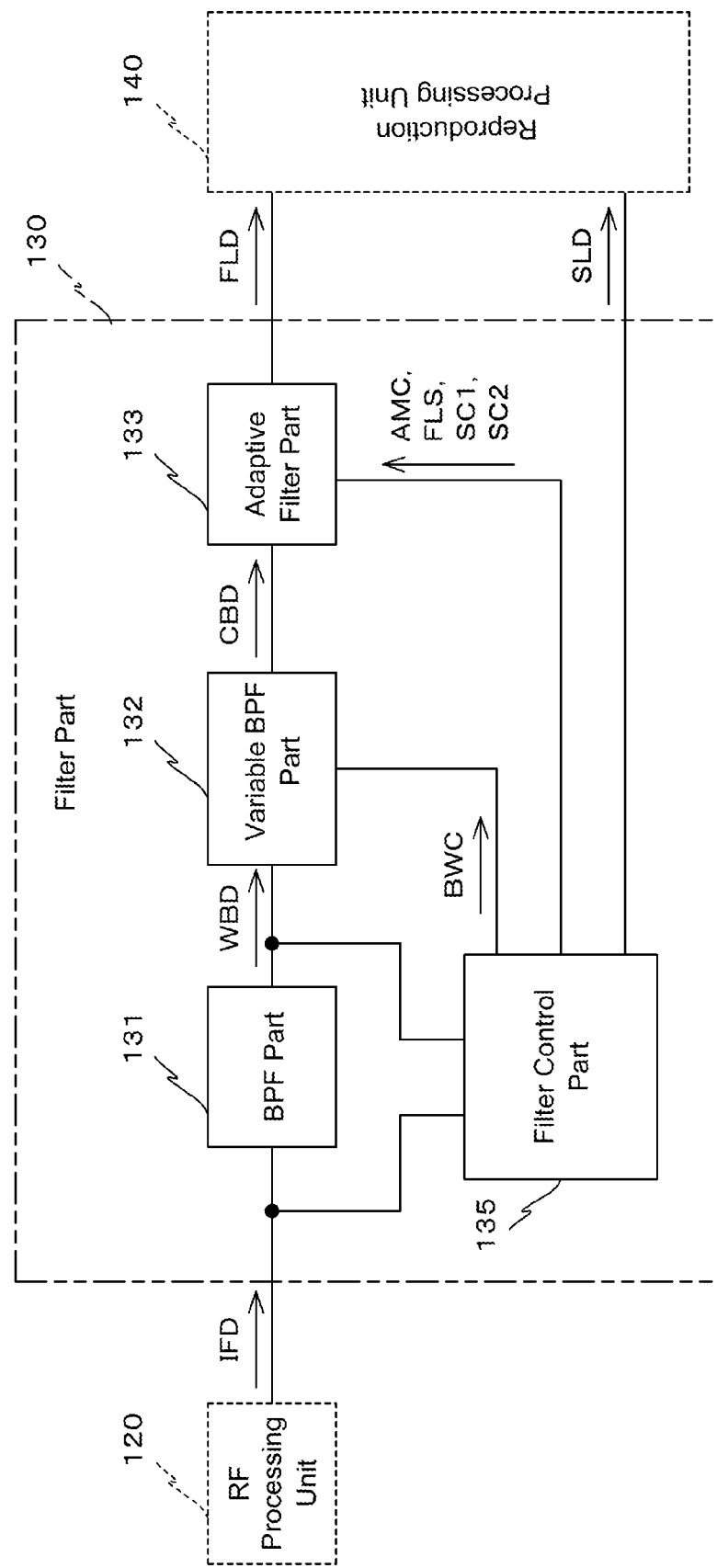
FIG. 2 is a block diagram showing the structure of a filter unit of FIG. 1.

Next, the structure of the filter unit 130 is explained. As shown in FIG. 2, the filter unit 130 comprises a band pass filter (BPF) part 131, a variable band pass filter (variable BPF) part 132, an adaptive filter part 133, and a filter control part 135.

The BPF part 131 receives the signal IFD send from the RF processing part 120. Then, the BPF part 131 selectively passes through the components on the frequency band in a range centered about a predetermined central frequency $IF_0$, from a lower limit frequency FL to an upper limit frequency FU among the frequency components included in the signal IFD. The signal WBD passed through the BPF part 131 is sent to both of the variable BPF part 132 and the filter control part 135.

Note that the range of a pass band of the BPF part 131 from the lower limit frequency FL to the upper limit frequency FU is preliminarily set so as to be a band that can be ideally reproduced during reproduction of the broadcast of the desired station. An example of the frequency change characteristic of the passage ratio of the BPF part 131 is shown in FIG. 3.

Figure 3:
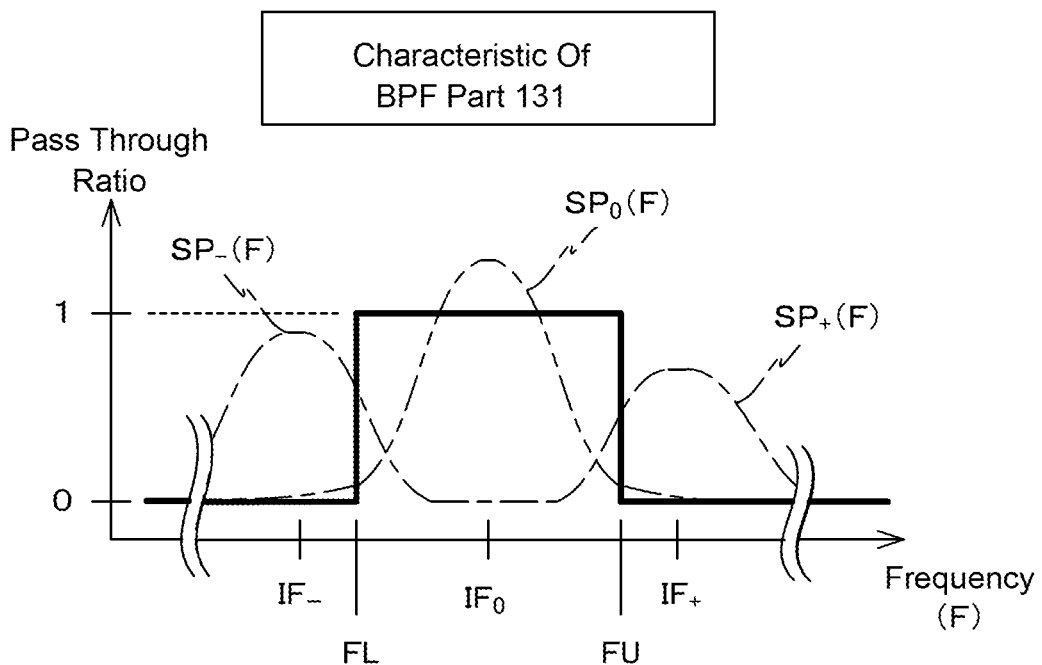
FIG. 3 is a block diagram showing the properties of a BPF unit of FIG. 2.

In FIG. 3, the central frequency of the next lower station, whose frequency is lower than the central frequency $IF_0$, is shown as "IF−". The central frequency of the next higher station, whose frequency is higher than the central frequency $IF_0$, is shown as "$IR_+$". Moreover, in FIG. 3, the example of the frequency distribution of the signal for the desired station is shown as the curve $SP_0(F)$, and those of the frequency distribution of the signals for the adjacent stations, i.e., of the next lower station and of the next higher station, are shown as the curves SP− (F) and $SP_+$ (F). Notations in FIG. 3 are also simultaneously used in FIGS. 4, 7, and 8 described hereinafter.

The variable BPF part 132 receives the signal WBD sent from the BPF part 131. Then, according to a pass band width instruction BWC sent from the filter control part 135, the variable BPF part 132 selectively passes the components within a pass band width specified by the pass band width instruction BWC, centered about the central frequency $IF_0$. The signal CBD passing through the variable BPF part 132 is sent to the adaptive filter part 133.

Figure 4:
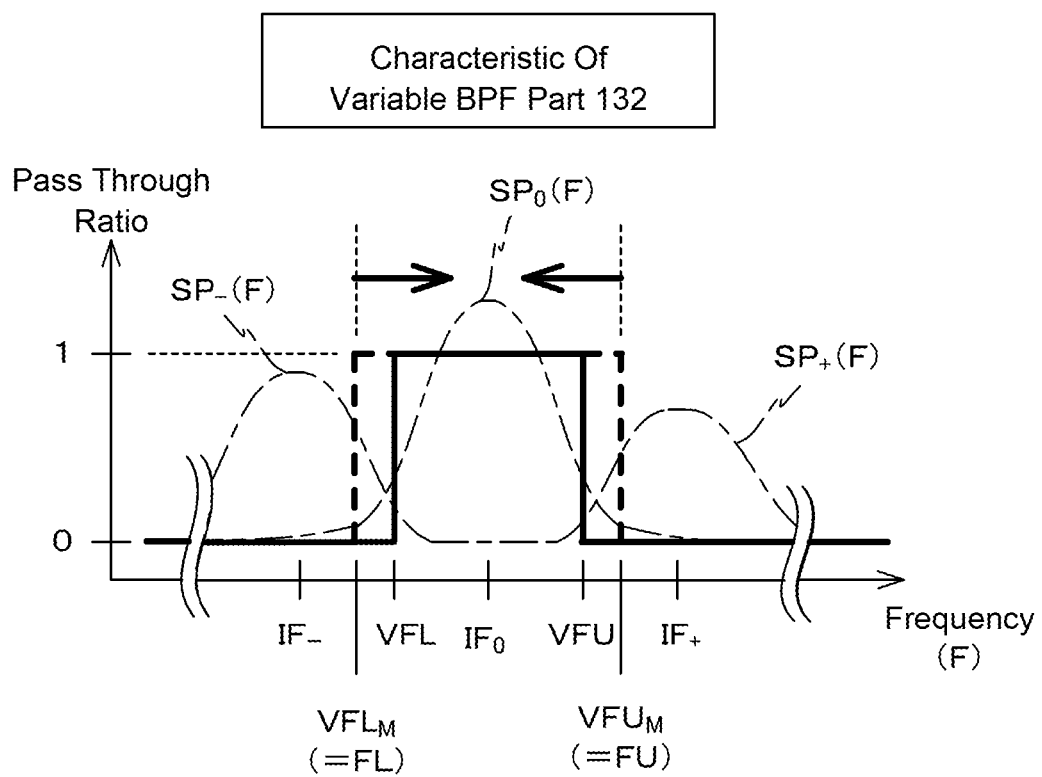
FIG. 4 is a block diagram showing the structure of a variable BPF unit of FIG. 2.

Note that the lower limit frequency $VFL_M$ of the signal passed through the variable BPF part 132 conform with the lower limit frequency FL of the signal passing through the BPF part 131. Moreover, the upper limit frequency $VFU_M$ of the signal passing through the variable BPF part 132 conform with the upper limit frequency FU of the signal passing through the BPF part 131. Then, based on the specification of the pass band width instruction BWC, it is arranged for the pass band width of the variable BPF part 132 so as to become a narrower band width than the maximum pass band width. The example of the frequency change characteristic of the pass through ratio of the variable BPF part 132 is shown in FIG. 4.

The adaptive filter part 133 receives the signal CBD sent from the variable BPF part 132. Then, the adaptive filter part 133 performs filtering processing adaptively upon the signal CBD, according to control by the filter control part 135. The signal FLD being subjected to filtering processing by the adaptive filter part 133 is sent to the reproduction processing unit 140. Note that the structure of the adaptive filter part 133 is described hereinafter.

The filter control part 135 receives the signal IFD sent from the RF processing part 120 and the signal WBD sent from the BPF part 131. Then, the filter control part 135 controls the pass band width of the variable BPF part 132 and of the filtering processing in the adaptive filter part 133, on the basis of these signals IFD and WBD. Moreover, the filter control part 135 detects the signal level WBD that reflects the field intensity of the broadcast airwaves of the desired station, and sends it to the reproduction processing unit 140 as the signal level SLD. Note that the structure of the filter control part 135 is described hereinafter.

Figure 5:
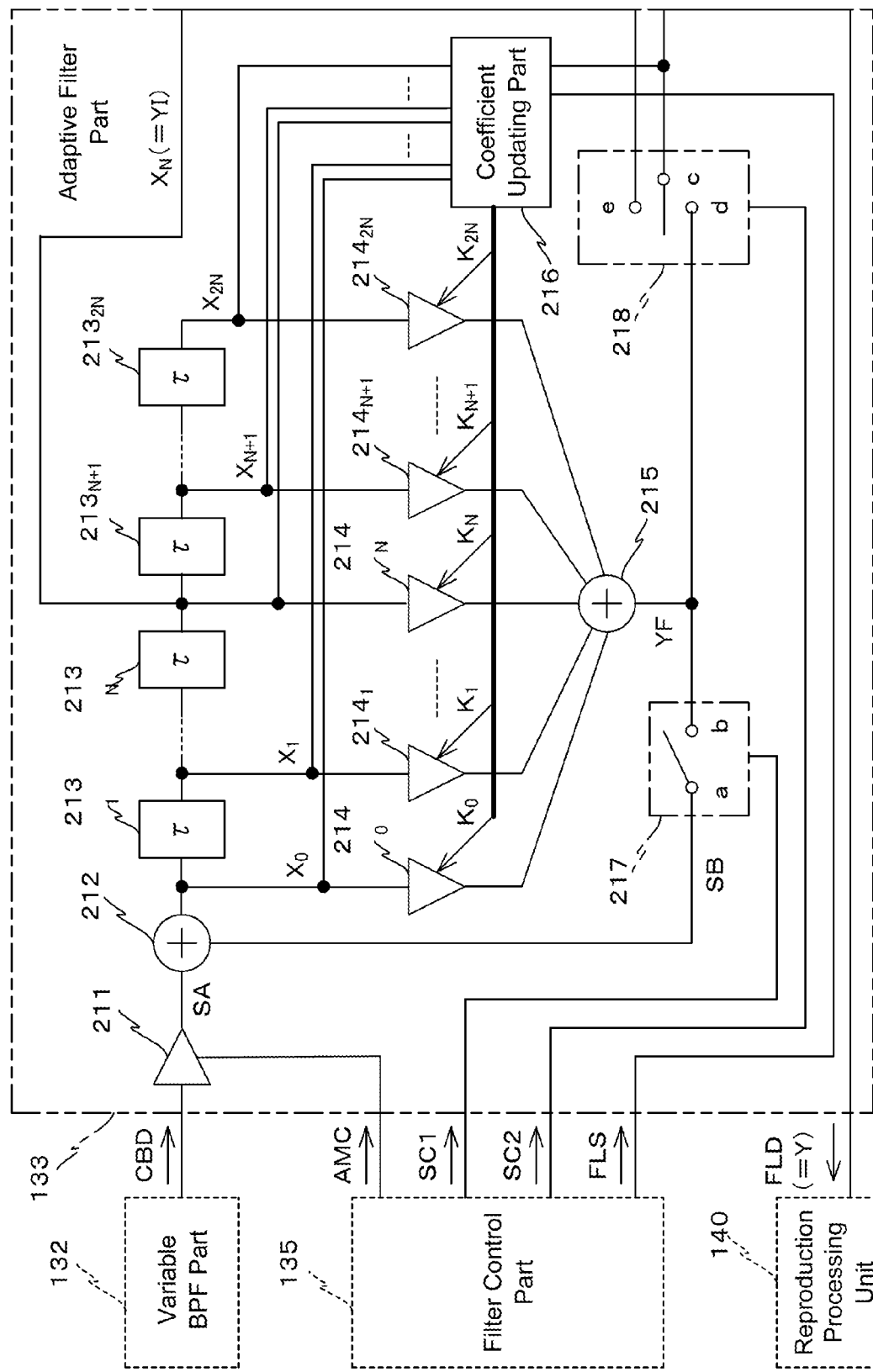
FIG. 5 is a block diagram showing the structure of an adaptive filter part of FIG. 2.

Next, the structure of the adaptive filter part 133 is explained. As shown in FIG. 5, the adaptive filter part 133 comprises an amplification part 211, an adder 212, 2N number of delay devices $213_1$ through $231_{2N}$, (2N+1) number of coefficient multipliers $214_0$ through $214_{2N}$, and an adder 215.

Moreover, the adaptive filter part 133 comprises a coefficient updating part 216, a switch part 217, and a switch part 218.

The amplification part 211 receives the signal CBD from the variable BPF part 132. Then, the amplification part 211 amplifies the signal by using an amplification ratio specified by an amplification ratio instruction AMC sent from the filter control part 135 to generate a signal SA. Thus generated signal SA is sent to the adder 212.

The adder 212 receives the signal SA sent from the amplification part 211 and a signal SB that is sent from the switch part 217. Then, the adder 212 adds together the signals SA and SB, to generate a signal $X_0(T)$. Thus generated signal $X_0(T)$ is sent to the delay device $213_1$ and to the coefficient multiplier $214_0$.

Each of the delay devices 213 (where j=1 through 2N) delays the signal $X_{j-1}(T)$ inputted by just a unit delay time period ti to outputs it as the signal $X_j(T)$. As a result, the relationship between the signal $X_j(T)$ and the signal $X_0(T)$ is given by the following Equation (1):

$$X_j(T)=X_0(T-j\cdot\tau) \quad (1)$$

Note that each of the delay devices 213 samples and outputs the signal $X_{j-1}(T)$ in synchronization with a reference clock signal having the period τ, not shown in the figures, in this embodiment. Due to this, the sampling results are held by the delay devices $213_j$ during the unit delay time period τ to be outputted. Here, the delay time period τ is ¼ of the period of the input signal $X_0(T)$.

The signal $X_j(T)$ generated by the delay device $213_j$ is sent to the coefficient multiplier $214_j$. Here, the signal $X_N(T)$ (=YI(T)) generated by the delay device $213_N$ is sent to the switch part 218. Note that it is arranged for the signal $X_0(T)$ to be sent to the coefficient multiplier $214_0$ as mentioned above.

Each of the coefficient multipliers $214_m$ (where m=0 through 2N) receives the signal $X_m(T)$ and a tap coefficient $K_m(T)$ from the coefficient updating part 216. Then, the coefficient multiplier $214_m$ multiplies together the signal $X_m(T)$ and the tap coefficient $K_m(T)$. The result of the multiplication is sent to the adder 215.

The adder 215 receives the results of multiplication $[X_0(T) \cdot K_0(T)]$ through $[X_{2N}(T) \cdot K_{2N}(T)]$ by the coefficient multipliers $214_0$ through $214_{2N}$. Then, the adder 215 calculates the signal YF(T) according to the following Equation (2):

$$YF(T)=[X_0(T)\cdot K_0(T)]+\ldots+[X_{2N}(T)\cdot K_{2N}(T)] \quad (2)$$

Thus calculated signal YF(T) is sent to the switch part 217 and to the switch part 218.

The coefficient updating part 216 receives the signal $X_0(T)$ sent from the adder 212, the signals $X_1(T)$ through $X_{2N}(T)$ sent from the delay devices $213_1$ through $213_N$, and the signal Y(=FLD) sent from the switch part 218. Then, the coefficient updating part 216 calculates the tap coefficients $K_0(T)$ through $K_{2N}(T)$ by using a CMA algorithm (Constant Modulus Algorithm), according to filtering processing specification as specified by a filter selection instruction FLS sent from the filter control part 135. Thus calculated tap coefficients $K_m(T)$ (where m=0 through 2N) is sent to the coefficient multipliers $214_m$.

By the way, as described hereinafter, the filter control part 135 specifies either "IIR" specification, "FIR" specification, or "OFF" specification for the filtering processing, according to the filter selection instruction FLS. If "IIR" is specified by the filter selection instruction FLS, the coefficient updating part 216 sequentially calculates the tap coefficients $K_0(T)$ through $K_{2N}(T)$, according to the following Equations (3) through (5), after setting the initial values of all the tap coefficients $K_0(T)$ through $K_{2N}(T)$ to 0.

$$ERR(T)=([Y(T)]^2+[Y(T-\tau)]^2)^{1/2}-VTH \quad (3)$$

$$K_m(T-\tau)=K_m(T)-\alpha\cdot ERR(T)\cdot P_m(T) \quad (4)$$

$$P_m(T)=X_m(T)\cdot Y(T)+X_m(T-t)\cdot Y(T-\tau) \quad (5)$$

Here, the value VTH is a predetermined convergence value, and is preliminary determined on the basis of an experiment, simulation, experience and so on. Moreover, the value α is a value for adjusting the convergence speed, and is also preliminary determined on the basis of the experiment, simulation, experience and so on.

Furthermore, if "FIR" is specified by the filter selection instruction FLS, the coefficient updating part 216 sequentially calculates the tap coefficients $K_0(T)$ through $K_{2N}(T)$, according to the Equations (3) through (5), after setting the initial values of the tap coefficients $K_0(T)$ through $K_{2N}(T)$ to predetermined values. Furthermore, if "OFF" is specified by the filter selection instruction FLS, then the coefficient updating part 216 always sets all of the tap coefficients $K_0(T)$ through $K_{2N}(T)$ to "0".

The switch part 217 has terminals a and b, and either connects its terminals a and b together or disconnects them, according to the switch control instruction SC1 sent from the filter control part 135. Here, the terminal a is connected to one of the input terminals of the adder 212. The terminal b is connected to the output terminal of the adder 215.

When "closed" is specified as the switch control instruction SC1, then the terminal a and the terminal b are connected each other in the switch part 217. As a result, the signal YF outputted from the adder 215 is being sent to the adder 212.

Moreover, when "open" is specified as the switch control instruction SC1, the terminal a and the terminal b are disconnected from one another by the switch part 217. Then, a signal with value "0" is sent from the terminal b to the adder 212.

The switch part 218 has a terminals c, d and e, either connects the terminals c and d together, or connects the terminals c and e together, according to a switch control instruction SC2 sent from the filter control part 135. Here, the terminal c is connected to an input terminal of the reproduction processing unit 140. The terminal d is connected to the output terminal of the adder 215. The terminal e is connected to the output terminal of the delay device $213_N$.

When "select d" is specified by the switch control instruction SC2, the terminals c d are connected each other in the switch part 218. As a result, the signal YF is sent from the adaptive filter part 133 to the reproduction processing unit 140 as the signal FLD.

Moreover, when "select e" is specified by the switch control instruction SC2, the terminals c and e are connected each other in the switch part 218. As a result, the signal YI is sent from the adaptive filter part 133 to the reproduction processing unit 140 as the signal FLD.

Figure 6:
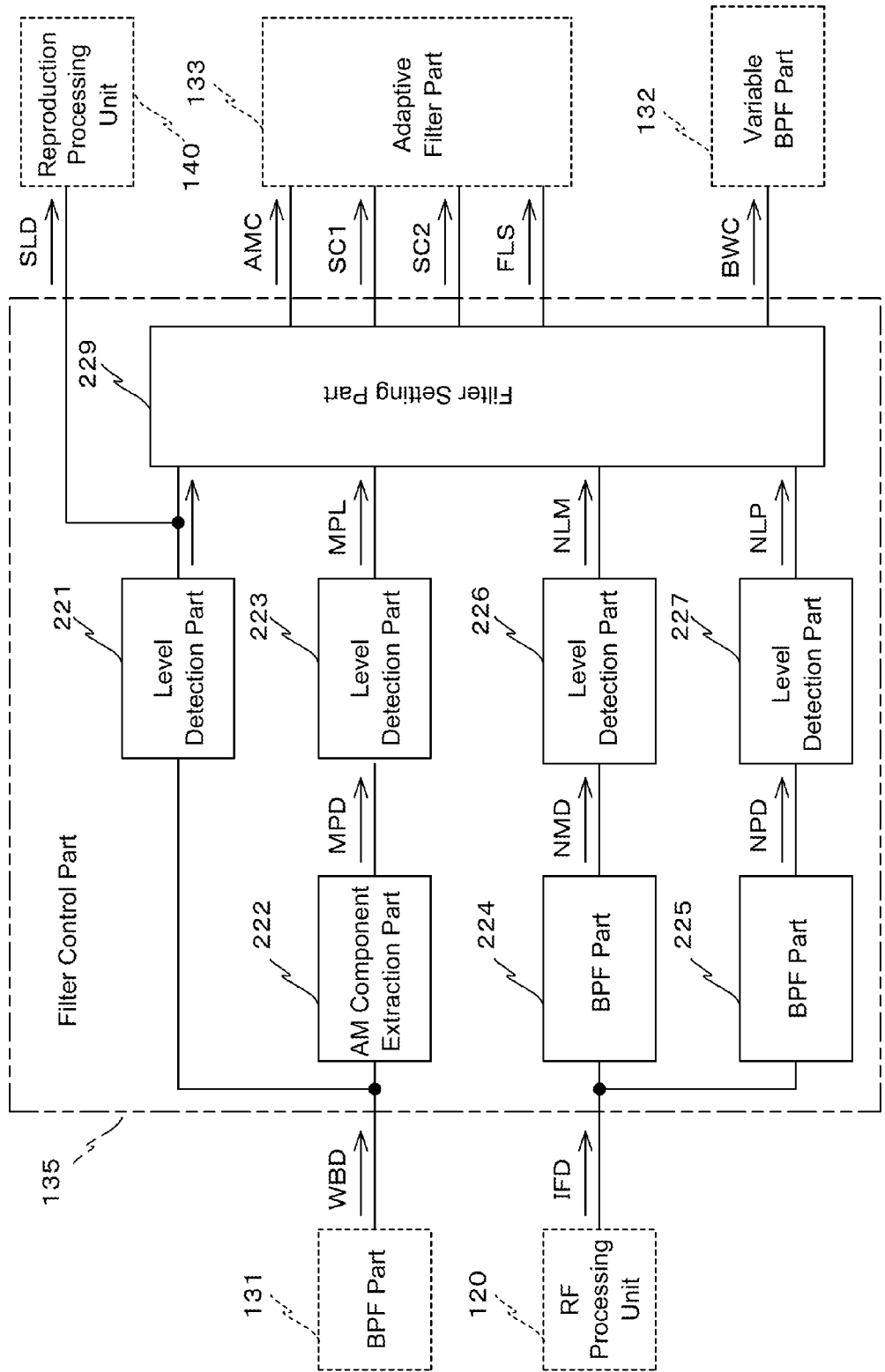
FIG. 6 is a block diagram showing the structure of a filter control part of FIG. 2.

Next, the structure of the filter control part 135 is explained. As shown in FIG. 6, this filter control part 135 comprises a level detection part 221 that serves as a first detection part, an amplitude modulation (AM) component extraction part 222 that serves as a portion of a second detection part, and a level detection part 223 serving as another portion of the second detection part. The filter control part 135 also comprises BPF parts 224 and 225 that serve as portions of the third detection means, and level detection parts 226 and 227 serving as other portions of the third detection means. Furthermore, the filter control part 135 comprises a filter setting part 229 serving as an evaluation part and as first and second control parts.

The level detection part 221 receives the signal WBD sent from the BPF part 131. Then, the level detection part 221 detects the signal WBD level. The detected result by the level detection part 221 reflects the field intensity of the broadcast airwaves of the desired station currently tuned. The level detection result by the level detection part 221 is sent to the filter setting part 229 and to the reproduction processing unit 140 as the signal SLD.

The AM component extraction part 222 receives the signal WBD sent from the BPF part 131. Then, the AM component extraction part 222 extracts the AM modulated component of the signal WBD. This AM modulated component is generated due to the influence of multipath fading. The extraction result by the AM component extraction part 222 is sent to the level detection part 223 as the signal MPD.

The level detection part 223 receives the signal MPD sent from the AM component extraction part 222. Then, the level detection part 223 detects the level of the signal MPD. The detection result by the level detection part 223 reflects the level of influence of multipath fading. The detection result by the level detection part 223 is sent to the filter setting part 229 as a multipath level MPL.

Figure 7:
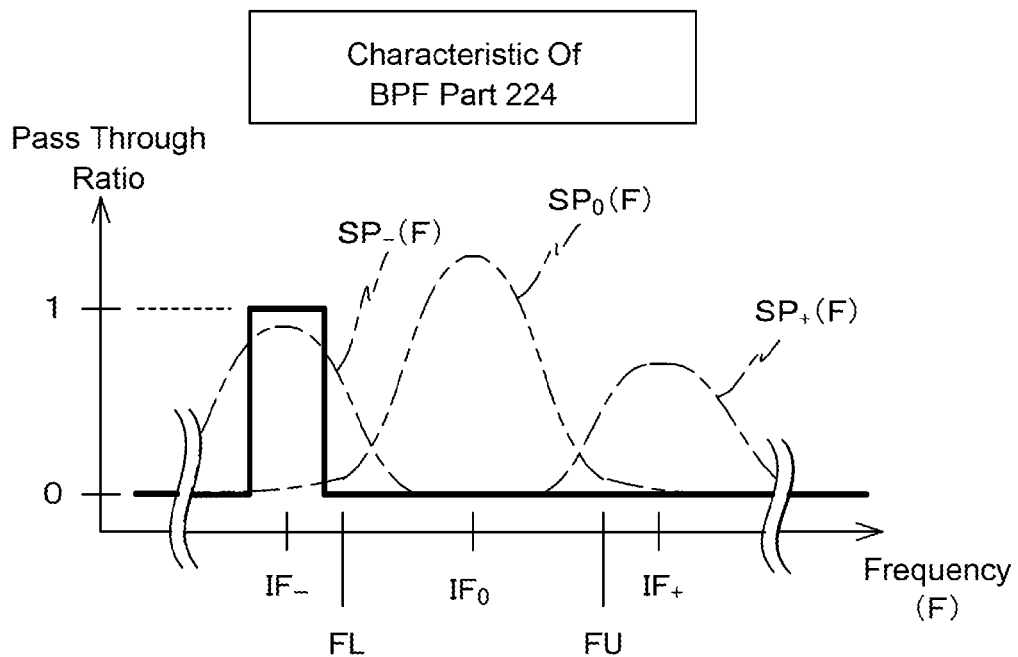
FIG. 7 is a block diagram showing the properties of a BPF part 224 of FIG. 6.

The BPF part 224 receives the signal IFD from the RF processing part 120. Then, the BPF part 224 allows the component on a narrow band centered upon the frequency $IF_-$ (refer to FIG. 3 or FIG. 4) to pass through. The signal NMD passed through the BPF part 224 is sent to the level detection part 226. Note that an example of the frequency change characteristic of the pass through ratio of the BPF part 224 is shown in FIG. 7.

Figure 8:
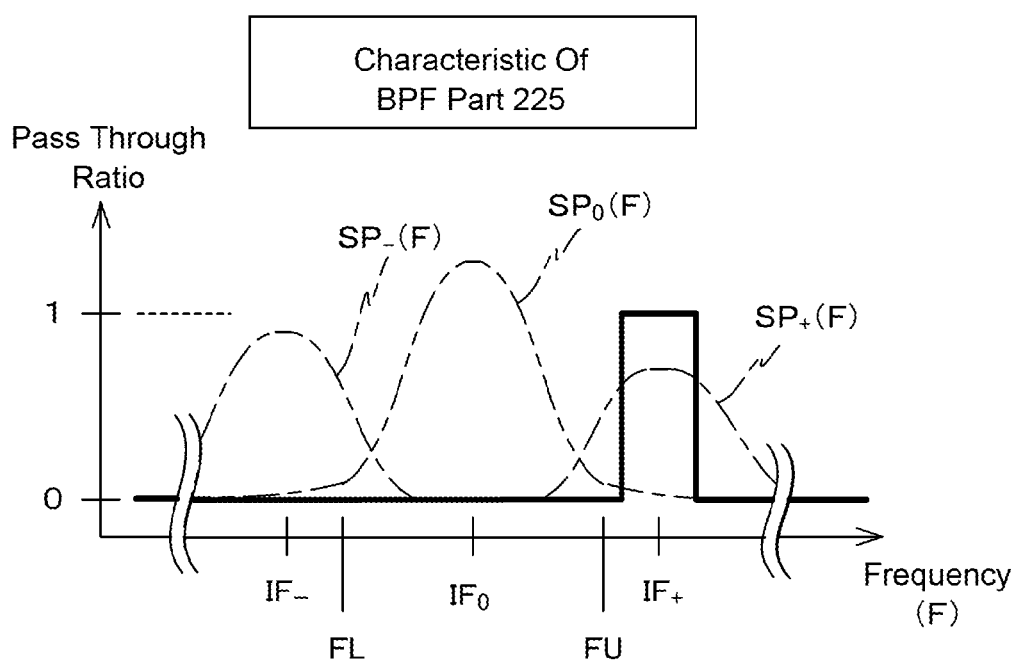
FIG. 8 is a block diagram showing the properties of a BPF part 225 of FIG. 6.

The BPF part 225 receives the signal IFD from the RF processing part 120. Then, the BPF part 225 allows the component on a narrow band centered upon the frequency $IF_+$ (refer to FIG. 3 or FIG. 4) to pass through. The signal NPD passed through the BPF part 225 is sent to the level detection part 227. Note that an example of the frequency change characteristic of the pass through ratio of the BPF part 225 is shown in FIG. 8.

The level detection part 226 receives the signal NMD sent from the BPF part 224. Then, the level detection part 226 detects the level of this signal NMD. The detection result by the level detection part 226 reflects the field intensity of the next lower station that takes the frequency $IF_-$ as its central frequency, and by extension reflects the mix ratio of the signal of the next lower station into the signal WBD. The detection result by the level detection part 226 is sent to the filter setting part 229 as the next lower station level NLM.

The level detection part 227 receives the signal NPD sent from the BPF part 225. Then, the level detection part 227 detects the signal NPD level. The detection result by the level detection part 227 reflects the field intensity of the next higher station that takes the frequency $IF_+$ as its central frequency, and by extension it reflects the mix ratio of the signal of the next higher station into the signal WBD. The detection result the level detection part 227 is sent to the filter setting part 229 as the next higher station level NLP.

The filter setting part 229 receives the signal level SLD, the multipath level MPL, the next lower station level NLM, and the next higher station level NLF sent from the level detection parts 221, 223, 226, and 227. Then, the filter setting part 229 determines a mode for filtering processing by the adaptive filter part 133 depending on the levels SLD, MPL, NLM, and NLP. The processing for the mode determination will be described hereinafter.

An IIR mode, an FIR mode, and an OFF mode are available as filtering processing modes determined by the filter setting part 229. When the filter setting part 229 determines the filtering processing mode to be the IIR mode, it sends an amplification ratio instruction AMC specifying an amplification ratio $A_1$ to the adaptive filter part 133. It also sends a switch control instruction SC1 specifying "closed" to the adaptive filter part 133. Moreover, when the filter setting part 229 determines the filtering processing node to be the IIR mode, along with sending a switch control instruction SC2 specifying "select e" to the adaptive filter part 133. It also sends a filter selection instruction FLS specifying "IIR" to the adaptive filter part 133. As a result, the adaptive filter part 133 updates the tap coefficients while feeding back the signal YI, and also works as an IIR type adaptive filter sending the signal YI to the reproduction processing unit 140 as the signal FLD (refer to FIG. 5).

Note that the amplification ratio $A_1$ is determined in advance on the basis of the experiments, simulation, experience and so on, from the standpoint of the stability of the IIR type adaptive filtering operation.

When the filter setting part 229 determines the filtering processing mode to be the FIR mode, it sends an amplification ratio instruction AMC specifying an amplification ratio $A_F$ ($>A_F$) to the adaptive filter part 133. It also sends a switch control instruction SC1 specifying "open" to the adaptive filter part 133. Moreover, when the filter setting part 229 determines the filtering processing mode to be the FIR mode, it sends a switch control instruction SC2 specifying "select d" to the adaptive filter part 133. It also sends a filter selection instruction FLS specifying "FIR" to the adaptive filter part 133. As a result, the adaptive filter part 133 updates the tap coefficients without feeding back the signal YI, and it also works as an FIR type adaptive filter sending the signal YF to the reproduction processing unit 140 as the signal FLD (refer to FIG. 5).

Note that the amplification ratio $A_F$ is determined in advance on the basis of the experiments, simulations, experience and so on, from the standpoint of the stability of the FIR type adaptive filtering operation.

When the filter setting part 229 determines the mode for filtering processing to be the OFF mode, it sends a switch control instruction SC1 specifying "open" to the adaptive filter part 133. Moreover, when the filter setting part 229 determines the filtering processing mode to be the OFF mode, it sends a switch control instruction SC2 specifying "select e" to the adaptive filter part 133. It also sends a filter selection instruction FLS specifying "OFF" to the adaptive filter part 133. As a result, the adaptive filter part 133 sends the signal YI to the reproduction processing unit 140 as the signal FLD (refer to FIG. 5) without performing any filtering processing.

Furthermore, the filter setting part 229 determines the pass band width of the variable BPF part 132 on the basis of the signal level SLD, the next lower station level NLM, and the next higher station level NLP. Then, the filter setting part 229 sends a pass band width instruction BWC specifying this pass band width that it has determined to the variable BPF part 132. Note that the processing for determining the pass band width will be specified hereinafter.

Figure 9:
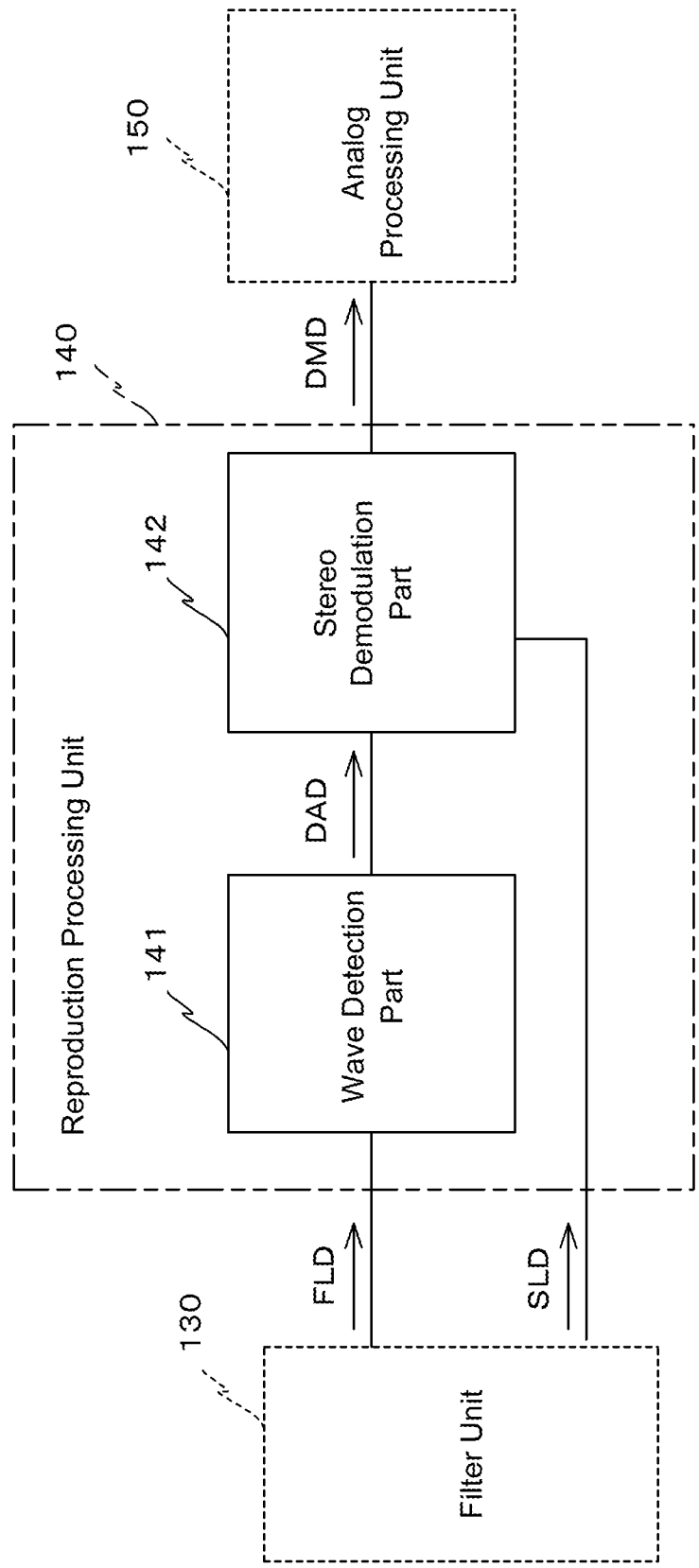
FIG. 9 is a block diagram showing the structure of a reproduction processing part of FIG. 1.

Next, the structure of the reproduction processing unit 140 will be explained. As shown in FIG. 9, the reproduction processing unit 140 comprises a wave detection part 141 and a stereo demodulation unit 142.

The wave detection part 141 receives the signal FLD sent from the filter unit 130. Then, the wave detection part 141 performs digital wave detection processing according to the predetermined method upon the signal FLD to generate a wave detection signal D/AD, a composite signal. Thus generated wave detection signal is sent to the stereo demodulation unit 142.

The stereo demodulation unit 142 receives the wave the detection signal D/AD sent from the wave detection part 141 and the signal level SLD sent from the filter unit 130. Then, the stereo demodulation unit 142 performs stereo demodulation processing upon the signal FLD, including separation processing according to a separation ratio that corresponds to the signal level SLD to generate a signal DMD. Thus generated signal DMD is sent to the analog processing unit 150.

Note that the higher the signal level SLD, the higher the separation ratio in the separation processing for being performed by the stereo demodulation unit 142.

[Operation]

The operation of the FM reception device 100 having the structure will now be explained, mainly focusing on the determination processing for the mode determination processing, which is performed in the adaptive filter part 133, by the filter setting part 229.

It is premised that a tuning specification is already inputted to the operation input unit 170 by the user, and that a tuning instruction CSL corresponding to the specified desired station is sent to the RF processing part 120. Moreover, it is premised that a volume adjustment specification is already inputted by the user to the operation input unit 170; and that an audio volume adjustment instruction VLC corresponding to the specified audio volume adjustment mode is sent to the analog processing unit 150 (refer to FIG. 1).

In this state, when a broadcast airwave is received by the antenna 110, the received signal RFS is sent from the antenna 110 to the RF processing part 120. Then, the frequency of the signal of the desired station being tuned is converted so as to become $IF_0$ as mentioned above in the RF processing part 120. Subsequently, A/D conversion of the signal is performed, and its result is sent to the filter unit 130 as the signal IFD (refer to FIG. 1).

In the filter unit 130, the BPF part 131 and the filter control part 135 receive the signal IFD. Upon receipt of the signal IFD, the BPF part 131 selectively passes through the component of the frequency band of the range from the lower limit frequency FL to the upper limit frequency FU centered at the predetermined central frequency $IF_0$ among the frequency components included in the signal IFD. Then, it sends the components to the variable BPF part 132 and to the filter control part 135 as the signal WBD (refer to FIG. 2).

In the filter control part 135, the BPF parts 224 and 225 receive the signal IFD. Upon receipt of the signal IFD, the BPF part 224 passes through the component of the narrow band centered upon the frequency $IF_-$, and sends it to the level detection part 226 as the signal NMD. Then, the level detection part 226 detects the signal NMD level to send the detection result to the filter setting part 229 as the next lower station level NLM (refer to FIG. 6).

Moreover, upon receipt of the signal IFD, the BPF part 225 passes through the component of the narrow band centered upon the frequency $IF_+$, and sends it to the level detection part 227 as the signal NPD. Then, the level detection part 227 detects the signal NPD level to send the detection result to the filter setting part 229 as the next lower station level NLP (refer to FIG. 6).

On the other hand, in the filter control part 135, the level detection part 221 and the AM component extraction part 222 receive the signal WBD sent from the BPF part 131. Then, upon receipt of this signal WBD, the level detection part 221 detects the signal WBD level to send the detection result to the filter setting part 229 and to the reproduction processing unit 140 as the signal level SLD (refer to FIG. 6).

Moreover, upon receipt of the signal WBD, the AM component extraction part 222 extracts the AM modulated components of the signal WBD, and sends the extraction result to the level detection part 223 as the signal MPD. Then, the level detection part 223 detects the signal MPD level to send the detection result to the filter setting part 229 as the multipath level MPL (refer to FIG. 6).

On the basis of the signal level SLD, the multipath level MPL, the next lower station level NLM and the next higher station level NLP that are detected as described above, the filter setting part 229 performs determination processing for the pass band width of the variable BPF part 132, and the filtering processing mode by the adaptive filter part 133.

<Determination Processing of the Pass Band Width in the Variable BPF Part 132>

When determining the pass band width of the variable BPF part 132, the filter setting part 229 firstly selects the highest among the next lower station level NLM and the next higher station level NLP. Thus selected level is referred to as the "adjacent station level NLV".

Next, the filter setting part 229 calculates the level ratio NLR (=NLV/SLD) between the adjacent station level NLV and the signal level SLD. Subsequently, on the basis of this level ratio NLR, the filter setting part 229 evaluates the mix ratio of adjacent channel interference components in the signal WBD, which passes through the BPF part 131 and is outputted.

Next, on the basis of the evaluated mix ratio, the filter setting part 229 determines the pass band width of the variable BPF part 132. Then, the filter setting part 229 sends a pass band width instruction BWC specifying the determined pass band width to the variable BPF part 132.

Note that it is arranged for the filter setting part 229 to determine the pass band width to be the wider, the lower is the evaluated mix ratio.

Upon receipt of the pass band width instruction BWC, the variable BPF part 132 passes through components in the signal WBD, which are having pass band width determined by the pass band width instruction BWC, located within the band centered around the central frequency $IF_0$. The signal CBD passing through the variable BPF part 132 is sent to the adaptive filter part 133.

<Mode Determination Processing Filtering Processing by the Adaptive Filter Part 133>

Figure 10:
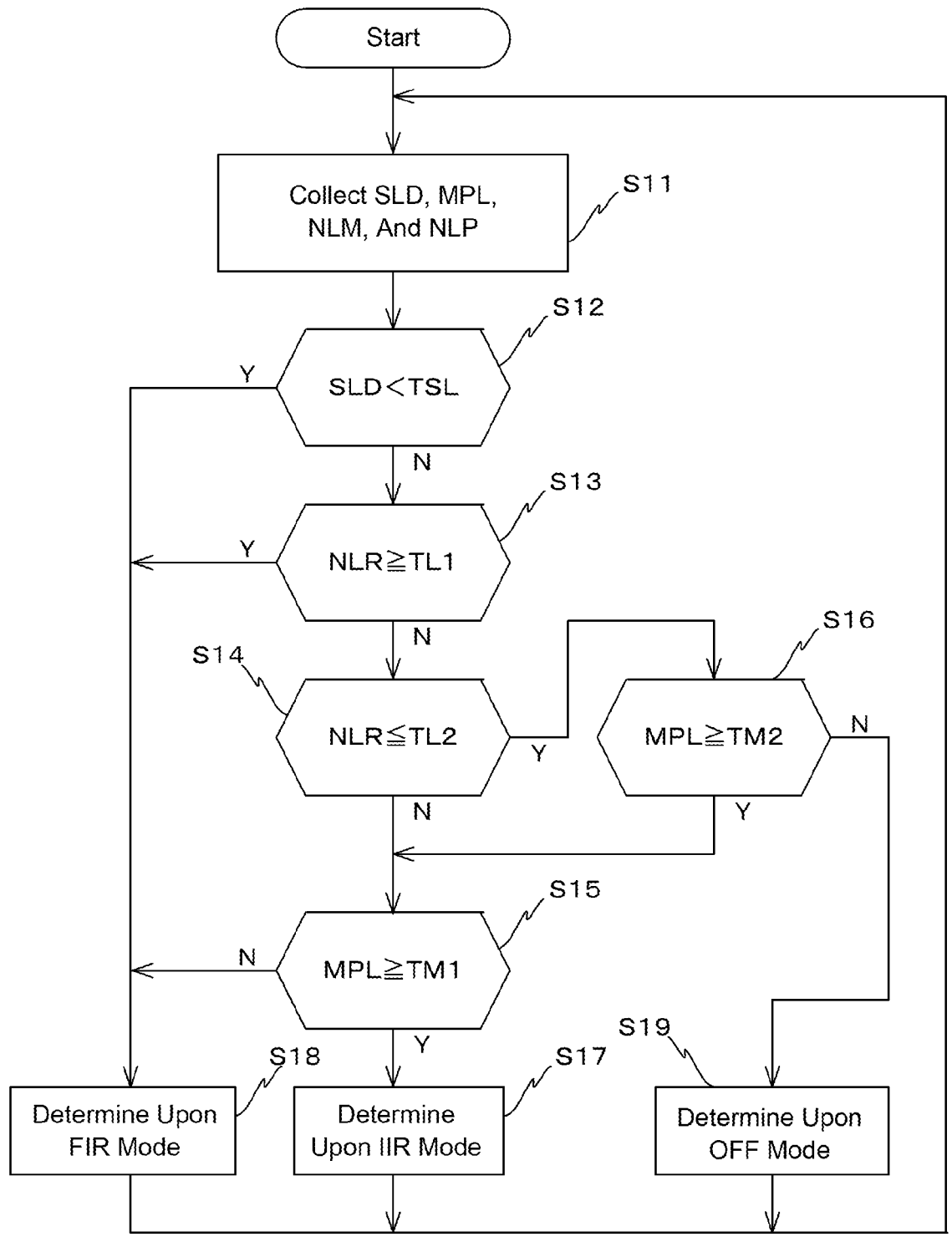
FIG. 10 is a flow chart for explanation of a filter control procedure in the FM reception device of FIG. 1.

During the processing for determining the filtering mode processing by the adaptive filter part 133, as shown in FIG. 10, firstly, the filter setting part 229 collects the signal level SLD, the multipath level MPL, the next lower station level NLM, and the next higher station level NLP in a step S11.

Subsequently, the filter setting part 229 decides whether or not the signal level SLD is less than a threshold value TSL in a step S12. Here, the threshold value TSL is preliminary determined as a value between signal levels of multipath fading generation and flat fading generation, on the basis of the experiments, simulation, experience, and so on.

If the decision result in the step S12 is affirmative (Y in the step S12), the flow proceeds to the step S18 hereinbelow. On the other hand, if the decision result in the step S12 is negative (N in the step S12), the flow proceeds to the step S13.

In the step S13, the filter setting part 229 decides whether the level ratio NLR calculated as described above is not less than a threshold value TL1. Here, the threshold value TL1 is preliminary determined from the standpoint of determining, the mix ratio with the signals from adjacent stations is used to determine the influence of adjacent channel interference generally becomes more serious, when both adjacent channel interference and multipath fading occur, on the basis of the experiments, simulation, experience, and so on.

If the decision result in the step S13 is affirmative (Y in the step S13), it is decided that the highest priority must be given to suppression of the influence of adjacent channel interference, and the flow proceeds to the step S18. On the other hand, if the decision result in the step S13 is negative (N in the step S13), the flow proceeds to a step S14.

In the step S14, the filter setting part 229 decides whether the level ratio NLR is less than or equal to a threshold value TL2 (<TL1).

Here, the threshold value TL2 is preliminary determined from the standpoint of determining whether there is adjacent channel interference of a level, at which it is not necessary for adaptive filtering processing to decrease the influence of adjacent channel interference, on the basis of the experiments, simulation, experience, and so on.

If the decision result in the step S14 is affirmative (Y in the step S14), it is decided that the adaptive filtering processing for decreasing the influence of adjacent channel interference is not necessary, and the flow proceeds to the step S16. In the step S16, the filter setting part 229 decides whether or not the multipath level MPL is not less than a threshold value TM2. Here, the threshold value TM2 is preliminary determined from the standpoint of determining whether the level is not necessary to perform adaptive filtering processing for decreasing the influence of multipath fading, on the basis of the experiments, simulation, experience, and so on.

If the decision result in the step S16 is negative (N in the step S16), the flow proceeds to a step S19. In the step S19, the filter setting part 229 determines the mode for filtering processing by the adaptive filter part 133 to be the OFF mode. Then, the filter setting part 229 sends a switch control instruction SC1 specifying "open" to the adaptive filter part 133. Moreover, when determining the filtering processing mode to be the OFF mode, it sends a switch control instruction SC2 specifying "select e" to the adaptive filter part 133. The filter setting part 229 also sends a filter selection instruction FLS specifying "OFF" to the adaptive filter part 133 (refer to FIG. 6). As a result, the adaptive filter part 133 sends the signal YI to the reproduction processing unit 140 as the signal FLD, without performing any filtering processing. After that, the flow returns to the step S11.

If the decision result in the step S16 is affirmative (Y in the step S16), the flow proceeds to the step S15. If the decision result in the step S14 is negative (N in the step S14), the flow proceeds to the step S15.

In the step S15, the filter setting part 229 decides whether or not the multipath level MPL is not less than a threshold value TM1 (>TM2). Here, the threshold value TM1 is preliminary determined from the standpoint of which of IIR type adaptive filtering and FIR type adaptive filtering is effective for decreasing the influence of multipath fading, on the basis of the experiments, simulation, experience, and so on.

If the decision result in the step S15 is affirmative (Y in the step S15), the flow proceeds to a step S17. In the step S17, the filter setting part 229 determines the filtering processing mode by the adaptive filter part 133 to be the IIR mode. Then, the filter setting part 229 sends an amplification ratio instruction AMC specifying the amplification ratio $A_I$ to the adaptive filter part 133, and also sends a switch control instruction SC1 specifying "closed" to the adaptive filter part 133. Moreover, when determining the filtering processing mode to be the IIR mode, it sends a switch control instruction SC2 specifying "select e" to the adaptive filter part 133, and it also sends a filter selection instruction FLS specifying "IIR" to the adaptive filter part 133 (refer to FIG. 6). As a result, the adaptive filter part 133 updates the tap coefficients while feeding back the signal YF, it also works as IIR type adaptive filter for sending the signal YI to the reproduction processing unit 140 as the signal FLD. After that, the flow returns to the step S11 (refer to FIG. 5).

If the decision result in the step S15 is negative (N in the step S15), the flow proceeds to the step S18. Moreover, as described above, if the decision result in the step S12 or in the step S13 is affirmative (Y in the step S12 or Y in the step S13), the flow proceeds to the step S18.

In the step S18, the filter setting part 229 determines the filtering processing mode by the adaptive filter part 133 to be the FIR mode. Then, it sends an amplification ratio instruction AMC specifying the amplification ratio $A_F$ to the adaptive filter part 133, and also sends a switch control instruction SC1 specifying "open" to the adaptive filter part 133. Moreover, when determining the filtering processing mode to be the FIR mode, the filter setting part 229 sends a switch control instruction SC2 specifying "select d" to the adaptive filter part 133, and it also sends a filter selection instruction FLS specifying "FIR" to the adaptive filter part 133. As a result, the adaptive filter part 133 updates the tap coefficients while not feeding back the signal YF, it works as an FIR type adaptive filter for sending the signal YI to the reproduction processing unit 140 as the signal FLD (refer to FIG. 5). After that, the flow returns to the step S11.

By repeating the processing of the steps S11 through S19 as described above, the filter setting part 229 determines the filter processing mode for the adaptive filter part 133, and performs settings upon the adaptive filter part 133 for filtering processing according to thus determined mode. The adaptive filter part 133 then performs filtering processing corresponding to the set mode upon the signal CBD sent from the variable BPF part 132. Then, the adaptive filter part 133 sends the filtering processing result to the reproduction processing unit 140 as the signal FLD.

In the reproduction processing unit 140 received the signal FLD from the filter unit 130, the wave detection part 141 performs detection processing upon the signal FLD. Then, the stereo demodulation unit 142 performs stereo demodulation processing upon the wave detection result, including separation processing according to the separation ratio corresponding to the signal level SLD. The result is sent to the analog processing unit 150 as the signal DMD (refer to FIG. 9).

In the analog processing unit 150 received the signal DMD from the reproduction processing unit 140, the D/A conversion part, the audio volume adjustment part, and the power amplification part sequentially perform their processing to generate the output audio signal AOS to send it to the speaker unit 160 (refer to FIG. 1). Then, the speaker unit 160 reproduces and outputs audio, according to the output audio signal AOS from the analog processing unit 150.

As has been explained above, in the embodiment, the level detection part 221 detects the field intensity of the broadcast airwave of the desired station, and the AM component extraction part 222 and the level detection part 223 work together to detect the multipath noise level. Then, if the field intensity of the broadcast airwave of the desired station is high and moreover the multipath noise level is comparatively low, the filter setting part 229 determines the filtering processing to be performed by the adaptive filter part 133 as being FIR type filtering processing. After that, the filter setting part 229 performs settings upon the adaptive filter part 133 for FIR type filtering processing.

According to this embodiment, it is possible to improve the reproduction quality of the broadcast contents broadcast from the desired station tuned.

Moreover, with this embodiment, the BPF part 224 and the level detection part 226 cooperate together to detect the field intensity of the broadcast airwave of the next lower station, and also the BPF part 225 and the level detection part 227 cooperate together to detect the field intensity of the broadcast airwave of the next higher station. Subsequently, the filter setting part 229 evaluates the adjacent channel interference level depending on the detection results of the field intensities from the broadcast airwaves of the next lower station and that of the next higher station.

Then, the filter setting part 229 determines the filtering processing to be performed by the adaptive filter part 133 to be FIR type filtering processing, if the adjacent channel interference level is high, even if the field intensity of the broadcast airwave of the desired station is high and moreover the multipath noise level is high. Then, the filter setting part 229 sets upon the adaptive filter part 133 for FIR type filtering processing.

On the other hand, the filter setting part 229 determines the filtering processing to be performed by the adaptive filter part 133 to be IIR type filtering processing in the case in which the field intensity of the broadcast airwave of the desired station is high and moreover the multipath noise level is high, and the adjacent channel interference level is low. After that, the filter setting part 229 sets upon the adaptive filter part 133 for IIR type filtering processing.

Due to this, according to the present embodiment, the adaptive filter part 133 is capable of filtering processing in overall consideration of the influence of multipath fading, flat fading, and adjacent channel interference.

Moreover, with the present embodiment, if the field intensity of the broadcast airwave of the desired station is high and both of the multipath noise level and the adjacent channel interference level are extremely low, the filtering processing by the adaptive filter part 133 is set to OFF. By this, a signal corresponding to the broadcast of the desired station is sent as the signal FLD without any signal distortion caused by the filtering processing by the adaptive filter part 133. Therefore, it enables to perform ideal separation processing by using a separation ratio corresponding to the signal level SLD.

Variant Embodiments

The present invention is not limited to the embodiment as described above, various alterations may be performed.

For example, while in the above-mentioned embodiment it is arranged for the AM component extraction part 222 and the level detection part 223 to cooperate together to detect the multipath level, it may be acceptable to employ ERR(T) calculated by Equation (3) as the multipath level. In this case, the AM component extraction part 222 and the level detection part 223 may be omitted.

Moreover, in the above-mentioned embodiment, it is solely arranged to compare the multipath level with a predetermined threshold value. However, it may be acceptable to decide that the detected multipath level is exceeded the predetermined threshold value, on the basis that the multipath level exceeds a predetermined threshold value over a continuous time period, or that the incidence at which the multipath level exceeds a predetermined threshold value is not less than a predetermined value. In this case, it may reduce frequency of changing of the filtering processing mode, even if the multipath level changes frequently along with motion of the vehicle or the like.

Furthermore, there are three types of filtering processing mode for the adaptive filter part 133 in the embodiment. However, it would also be acceptable to eliminate the OFF mode and to provide only two types. In this case, it may be possible to omit the processing corresponding to the OFF mode for the filter setting part 229.

Note that it may be also acceptable to employ the computer as a calculation means being composed of a central processing device (CPU: Central Processing part), a DSP (Digital Signal Processor) and so on, instead of the filter unit 130, the reproduction processing unit 140, and the reception control unit 190 in the embodiment to perform a part of entire processing thereof by executing a program preliminary prepared. The program may be recorded on a computer-readable recording medium such as a hard disk, CD-ROM, DVD or the like, and it is read out and executed by the computer. Alternatively, it may be also acceptable to obtain as the stored program in the portable type format recording medium such as CD-ROM, DVD or the like. It also may be obtained as distribution format via a network such as the internet or the like.

The invention claimed is:

1. An FM reception device comprising:
a first detection part configured to detect a field intensity of an FM wave;
a second detection part configured to detect a multipath noise level on a frequency band region of said FM wave;
an adaptive filter part configured to selectively perform filtering processing upon an intermediate frequency signal according to said FM wave by using a selected filter, when either one of a finite impulse response type filter or an infinite impulse response type filter is selected responding to a filter selection instruction; and
a first control part configured to send a instruction to choose said finite impulse response type filter as said filter selection instruction to said adaptive filter part, when a first condition is satisfied that the field intensity detected by said first detection part is lower than a predetermined field intensity; or when a second condition is satisfied that the field intensity detected by said first detection part is not lower than said predetermined field intensity, and it is decided that the multipath noise level is lower than a first predetermined multipath noise level and the multipath noise level is not lower than a second predetermined multipath noise level, which is lower than the first predetermined multipath noise level.

2. An FM reception device according to claim 1, wherein said first control part configured to decide that said multipath noise level is not lower than the first predetermined multipath noise level, if the ratio of time in which the multipath noise level is not lower than a first predetermined value.

3. An FM reception device according to claim 2 further comprising:
a high frequency processing part configured to convert the signal on the frequency band signal of said FM wave to that on a predetermined intermediate frequency band signal;
a band pass filter part configured to selectively pass through a component on a first frequency band included in said predetermined intermediate frequency band in a first signal converted by said high frequency processing part,
a variable band pass filter part configured to selectively pass through a component on a second frequency band in a second signal, which has a frequency width that is specified by a frequency width command and included in the first frequency band, to send it to said adaptive filter part;
a third detection part configured to detect the field intensity of an adjacent FM wave generated from a neighboring FM station that is adjacent in relation to frequency to the FM station that generates said FM wave;

an evaluation unit configured to evaluates the level of mixing of the signal of said adjacent FM wave in said first signal, on the basis of the field intensity detected by said first detection part and the field intensity detected by said third detection part;

and a second control part configured to determine a frequency width on the basis of said level of mixing that has been evaluated, and sends to said variable band pass filter part said frequency width command to the effect that said determined frequency width is to be set;

and in that said first control part:

which configured to send a command to said adaptive filter part as said filter selection instruction, to the effect that processing by said finite impulse response type filter is to be selected, if a third condition is satisfied that, while the field intensity detected by said first detection part is greater than or equal to said predetermined field intensity, said level of mixing that has been evaluated is greater than or equal to a first predetermined level of mixing; and configured to send a command to said adaptive filter part as said filter selection instruction, to the effect that processing by said infinite impulse response type filter is to be selected, if a fourth condition is satisfied that, while the field intensity detected by said first detection part is greater than or equal to said predetermined field intensity, it is decided that the level of said multipath noise is greater than or equal to said first predetermined multipath noise level, and moreover said level of mixing that has been evaluated is less than said first predetermined level of mixing.

4. An FM reception device according to claim 2, wherein said second predetermined multipath noise level is the zero level.

5. An FM reception device according to claim 1 further comprising:

a high frequency processing part configured to convert the signal on the frequency band signal of said FM wave to that on a predetermined intermediate frequency band signal;

a band pass filter part configured to selectively pass through a component on a first frequency band included in said predetermined intermediate frequency band in a first signal converted by said high frequency processing part, a variable band pass filter part configured to selectively pass through a component on a second frequency band in a second signal, which has a frequency width that is specified by a frequency width command and included in the first frequency band, to send it to said adaptive filter part;

a third detection part configured to detect the field intensity of an adjacent FM wave generated from a neighboring FM station that is adjacent in relation to frequency to the FM station that generates said FM wave;

an evaluation unit configured to evaluates the level of mixing of the signal of said adjacent FM wave in said first signal, on the basis of the field intensity detected by said first detection part and the field intensity detected by said third detection part;

and a second control part configured to determine a frequency width on the basis of said level of mixing that has been evaluated, and sends to said variable band pass filter part said frequency width command to the effect that said determined frequency width is to be set;

and in that said first control part:

which configured to send a command to said adaptive filter part as said filter selection instruction, to the effect that processing by said finite impulse response type filter is to be selected, if a third condition is satisfied that, while the field intensity detected by said first detection part is greater than or equal to said predetermined field intensity, said level of mixing that has been evaluated is greater than or equal to a first predetermined level of mixing; and configured to send a command to said adaptive filter part as said filter selection instruction, to the effect that processing by said infinite impulse response type filter is to be selected, if a fourth condition is satisfied that, while the field intensity detected by said first detection part is greater than or equal to said predetermined field intensity, it is decided that the level of said multipath noise is greater than or equal to said first predetermined multipath noise level, and moreover said level of mixing that has been evaluated is less than said first predetermined level of mixing.

6. An FM device according to claim 5, wherein said second predetermined multipath noise level is a level greater than the zero level, and said first control part:

which configured to send a instruction to said adaptive filter part as said filter selection instruction, to the effect that processing by said finite impulse response type filter is to be selected, if a fifth condition is satisfied that, while the field intensity detected by said first detection part is not lower than said predetermined field intensity, it is decided that said multipath noise level is lower than said second predetermined multipath noise level, and moreover that said mix ratio that has been evaluated is greater than or equal to a second predetermined mix ratio that is lower than said first predetermined mix ratio; and which configured to send a instruction to said adaptive filter part as said filter selection instruction, to the effect that said filtering processing is not to be performed, if a sixth condition is satisfied that, while the field intensity detected by said first detection part is not lower than said predetermined field intensity, it is decided that said multipath noise level is lower than said second predetermined multipath noise level, and moreover that said evaluated mix ratio is lower than said second predetermined mix ratio.

7. An FM reception device according to claim 5, wherein said second predetermined multipath noise level is the zero level.

8. An FM reception device according to claim 1, wherein said second predetermined multipath noise level is the zero level.

9. A filtering method, used by an FM reception device comprising: a first detection part configured to detect the field intensity of an FM wave, a second detection part configured to detect the multipath noise level on the frequency band region of said FM wave, and an adaptive filter part configured to selectively perform filtering processing upon an intermediate frequency signal according to said FM wave with said selected filter by a filter selection instruction, if either one of a finite impulse response type filter or an infinite impulse response type filter is selected, comprising the steps of deciding whether or not either a first condition or a second condition is satisfied, wherein the first condition is that the field intensity detected by said first detection part is lower than a predetermined field intensity, and the second condition is that the field intensity detected by said first detection part is not lower than said predetermined field intensity, the multipath noise level is lower than a first predetermined multipath noise level, and the multipath noise level is not lower than a second predetermined multipath noise level which is lower than said first predetermined multipath noise level, and controlling so as to send an instruction that said finite impulse response type filter is to be selected, if the decision result of said decision process is affirmative, to said adaptive filter part, as said filter selection instruction.

10. A filtering processing program wherein by causing a filtering processing method according to claim 9 to be executed by a calculation part.

11. A recording medium wherein a filtering processing program according to claim 10 is recorded so as to be capable of read by a calculation part is recorded thereupon.

* * * * *